United States Patent [19]

Weidler

[11] 4,118,834

[45] Oct. 10, 1978

[54] STRETCHING DEVICE

[76] Inventor: Erhard Alfred Weidler, Jahnstr. 32, 7080 Aalen-Unterkochen, Fed. Rep. of Germany

[21] Appl. No.: 811,623

[22] Filed: Jun. 30, 1977

[30] Foreign Application Priority Data

Jul. 13, 1976 [DE] Fed. Rep. of Germany ....... 2631967

[51] Int. Cl.² ............................................. B60C 27/10
[52] U.S. Cl. ................................... 24/68 TT; 24/69 T
[58] Field of Search ............. 24/68 R, 68 CT, 68 TT, 24/68 D, 69 TT, 69 T, 71 TT, 73 CS, 68, 69

[56] References Cited

U.S. PATENT DOCUMENTS 3,028,645  4/1962  Stearman et al. ................. 24/68 TT

FOREIGN PATENT DOCUMENTS 452,217  8/1936  United Kingdom .................... 24/69 T Primary Examiner—Louis K. Rimrodt
Attorney, Agent, or Firm—Parmelee, Johnson, Bollinger & Bramblett

[57] ABSTRACT

A stretching device for stretching of a tire chain, particularly an anti-skid chain. The stretching device comprises a stretching spring, a stretching aggregate for stretching the spring and a stretching element for maintaining an associated tire chain in a stretched position when the spring is stretched. The stretching device eliminates the need for adjusting the tire chain to compensate for slack caused by revolution of the wheels carrying the tire chain.

18 Claims, 3 Drawing Figures

4,118,834

STRETCHING DEVICE

BACKGROUND OF THE INVENTION

The invention relates to a stretching device for the stretching of a tire chain, especially an anti-skid chain, with the aid of a stretching chain that is connected to the stretching device.

Stretching devices of this kind in the form of stretching levers with eccentric action are known. However only short stretching paths can be realized with these stretching devices, so that shortly after the anti-skid chain has been installed, (i.e. after a few revolutions of the wheel that carries it,) the anti-skid chain may have to be adjusted. Additionally, these known devices are relatively difficult to handle and manipulate.

It is an object of the present invention to provide a stretching device that is easy to handle and through which the tension of the anti-skid chain can be maintained over long periods of time without requiring any adjustment. The present invention provides a stretching device which has a stretching spring that can be stretched by a body referred to as a stretching aggregate. One end of the stretching spring activates at least one stretching element which holds the stretching chain stretched when the stretching spring is stretched.

SUMMARY OF THE INVENTION

The stretching device according to the present invention offers the advantage that a stretching of the stretching chain is produced via the stretching spring placed between the stretching chain and the stretching aggregate. The stretching spring then assumes the function of a stretching power storing device that prevents an undesirable premature loosening of the stretching chain. Through the use of a suitable stretching aggregate the stretching spring can easily be stretched without any considerable effort, which contributes not only to the easier operating of the stretching device as well as of the anti-skid chain.

Of particular advantage is a stretching device which has a stretching aggregate with two studs shaped as rings or sleeves that surround one section of the stretching chain. One of these studs serves to stretch the stretching spring and the second stud serves to stop the stretching device on the stretching chain. In this manner, a pair of stretching elements which serve to stretch the stretching spring is provided at the first stud and a pair of clamping devices is provided at the second stud.

The stretching aggregate preferably has a spindle and an outer sleeve that is screwed on to the spindle, whereby the outer sleeve and the spindle, which is shaped like an inner sleeve, surround the stretching chain in the same way as the studs and the stretching spring.

BRIEF DESCRIPTION OF THE DRAWINGS

The invention is explained in greater detail by the following description of the preferred embodiment when read in conjunction with the attached drawings.

DESCRIPTION OF THE PREFERRED EMBODIMENT

Figure 1:
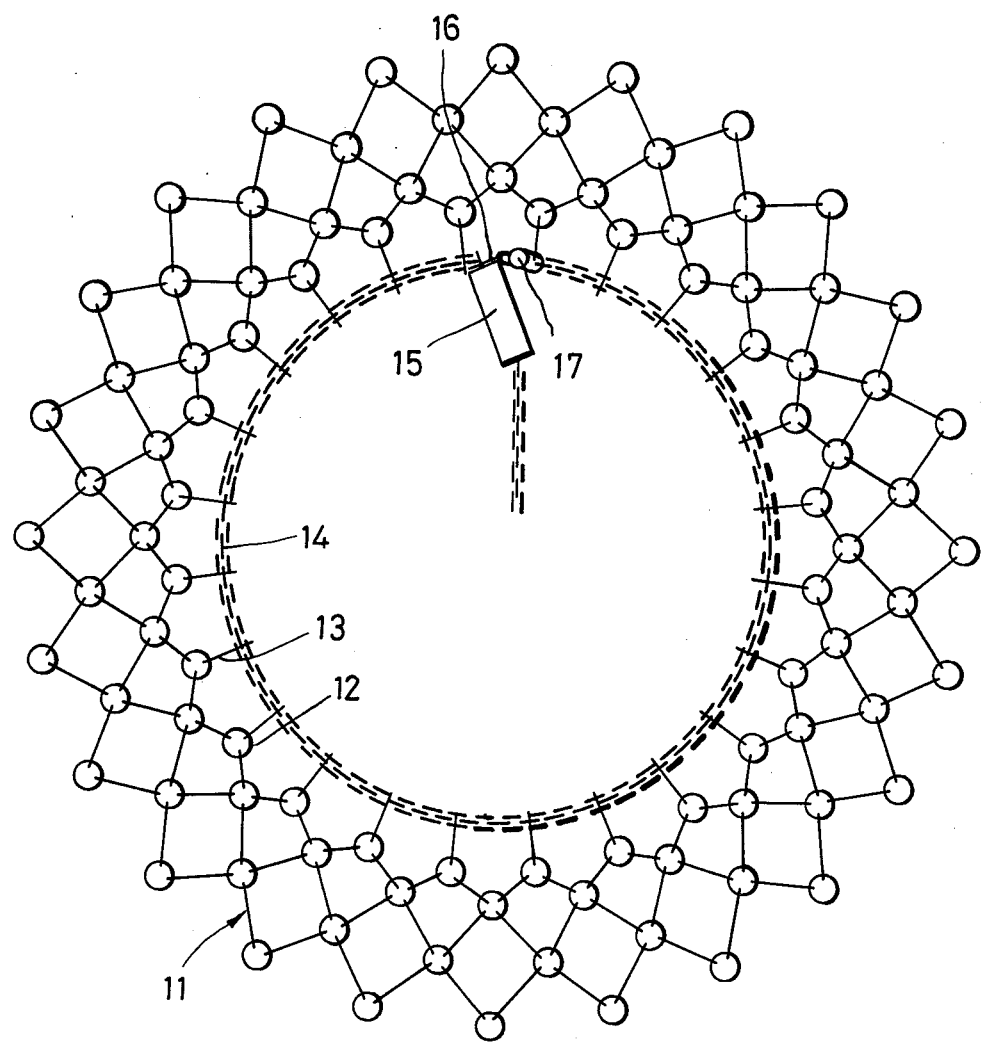
FIG. 1 shows the side net of an anti-skid chain with a stretching chain and a stretching device.

In FIG. 1 the number 11 indicates in general the side net of an anti-skid chain. The corner points of the inner edge of the side net are formed by rings 12. Eyelets 13, formed by oval links, are placed at the corner points. A stretching chain 14 is led through the oval links.

One end of the stretching chain 14 is connected to a stretching device 15 which rests against an abutment 16 formed by a ring hung in a chain connector 17. This chain connector connects the other end of the stretching chain 14 with one of the eyelets 13 of the side net.

FIG. 1 shows the separate parts of the side net 11 in the most advantageous position. However, this position can in practice not always be realized. The arrangement of the separate members may, for example, be disturbed when the tire goes flat. Such flattenings are, among other occurrences, unavoidable when a truck, provided with chains, takes up heavy loads. As a consequence of the temporary deformations of the tire and the influence of this on the configuration of the net, a loosening of the stretching chain 14 can occur when no means are provided to maintain the force on the stretching chain. The stretching device 15 serves to maintain a force on the stretching chain 14. Two embodiments of such a stretching device are shown in FIGS. 2 and 3.

Figure 2:
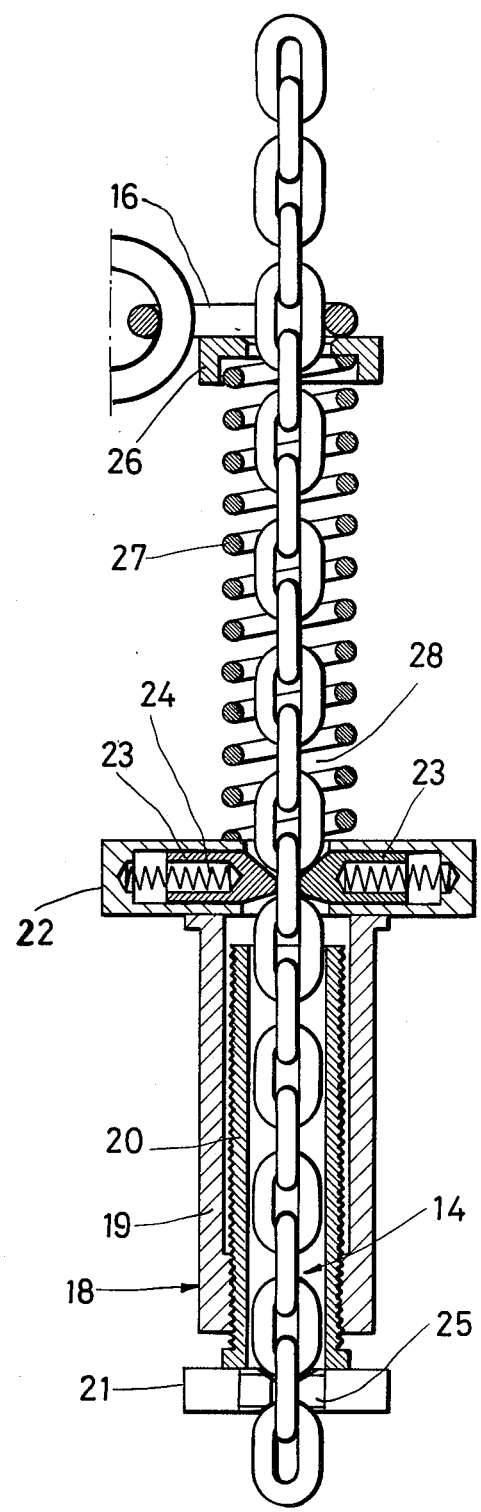
FIG. 2 shows, partly in section, the side view of a first stretching device.
Figure 3:
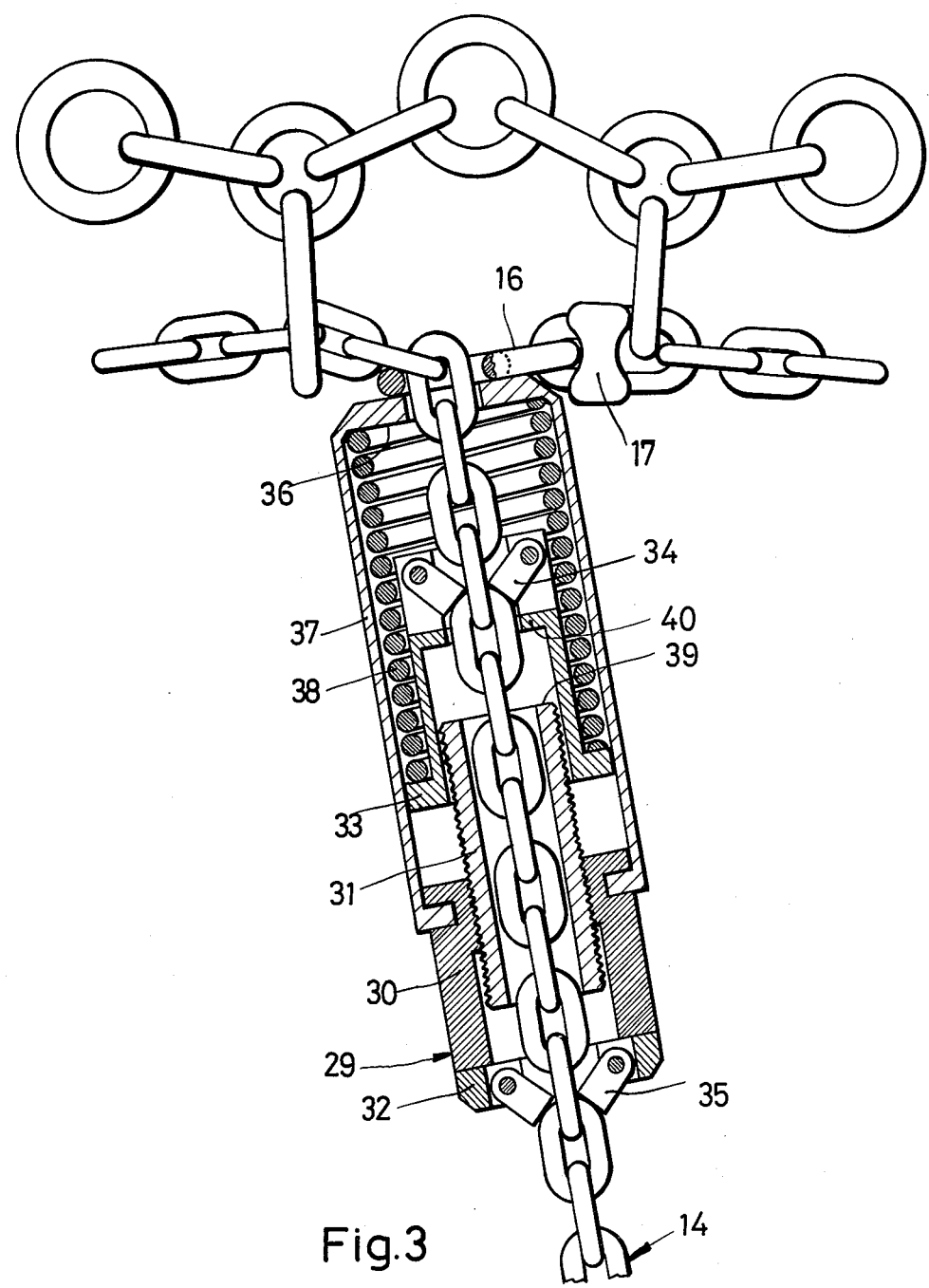
FIG. 3 shows, likewise partly in section, the side view of a second stretching device.

FIG. 2 illustrates that the stretching device comprises a stretching aggregate 18 with an outer sleeve 19 and an inner sleeve 20 designed as a screwthread spindle. The stretching aggregate 18 is located between two studs 21 and 22. The stud 22 holds two safety bolts 23 which are passed onto the stretching chain 14 by reset springs between two adjacent chain links of the same orientation. The front ends of the safety bolts are so designed that, as can be seen in FIG. 2, they allow a downward movement of the stretching chain but do not allow any upward movement of the stretching chain. The stud 21 is provided with locking elements 25 that are constructed in the same manner as the safety bolts 23.

A stretching spring 27 is placed between the stud 22 and a supporting element 26. The supporting element rests against an abutment 16 formed by a ring through which the stretching chain 14 runs.

When the stretching chain is stretched, the outer sleeve 19 (designed as an outer nut) is screwed on to the inner sleeve 20 in the direction of the stud 22. This stud then presses the stretching spring 27 together. Because of the ramp-shaped design of the tips of the safety bolts 23, these bolts retract from the shown position, and only after a displacement of the stud 22 over a corresponding stretch, engage the next gap 28 between two chain links. The stretching chain is held tightly in this screw movement by the locking elements 25 of the stud 21 between the studs 21 and 22.

After the stretching spring 27 has been compressed, the stretching aggregate is screwed back into its starting position. The result is that a loosening of the stretching chain 14 (to an amount on the order of magnitude of the stretching path of the stretching spring 27) is eliminated.

The characteristic line of the curve of the stretching spring 27 should have a part in which the spring power is independent from the stretch path. If such a curve cannot be realized by a wire coil spring of the kind shown, then the use of Belleville springs is recommended (plate springs).

The stretching device according to FIG. 3 has a stretching aggregate 29 with an outer sleeve 30 and a threaded spindle designed as an inner sleeve 31. The rear end of the stretching aggregate rests against a stud 32 that is ring shaped, and the front end of the stretching aggregate acts upon a stud 33 shaped as a sleeve. The stud 33 is provided with safety bolts 34, which in this case are designed as pivoted levers. The locking elements 35 of the stud 32 also have the form of pivoted levers.

A stretching spring 38 is shown in the embodiment in the stretched position, and a support element 37 designed as a protective sleeve are located between the stud 32 and the bottom 36. When the stretching spring 38 is placed in the shown position, the inner sleeve 31 presses with its front surface against the bottom 40 of the sleeve-shaped stud 33. The distance between the bottom 40 and the front surface 39 corresponds to the spring path along which loosenings in the stretching chain 14 are equalized.

To review the operation of the invention (with particular reference being made to the embodiment illustrated in FIG. 2), it has been shown that the stretching chain 14 is received by eyelets (oval links) 13 positioned around the inner periphery of a tire chain mounted on a tire. After the stretching chain has completed a closed loop one of its ends is received by a stretching device 15 including a spring loaded supporting element 26 which abuts against an abutment 16 attached to the other end of the stretching chain 14 by means of a chain connector 17.

The end of the stretching chain 14 received by the stretching device 15 is held firmly therein by locking means formed by safety bolts 23 and locking elements 25 belonging to ring-shaped upper and lower studs 22 and 21 of the stretching device. A stretching spring 27 positioned between the upper stud 22 and the supporting element 26 exerts a force on the supporting element 26 thus tending to enlarge the distance between said supporting element 26 and said upper stud 22. By holding the supporting element 26 in an initial predetermined position a constant tension is maintained on the stretching chain 14 which in turn maintains the constant tension on the tire chain.

The tire chain is initially held snugly against the tire. With growing wear of the links of the tire chain the pitch of the links also increases. As a result loosening of the tire chain and the stretching chain 14 is unavoidable. This loosening is to a certain degree compensated by the stretching spring 27. Of course after certain time intervals (the length of which depends on the degree of wear of the chain) re-setting of the stretching device is necessary. For this purpose the outer sleeve 19 is turned with respect to the inner sleeve 20. As a result the upper stud 22 (looked at in FIG. 2) is moved upwards, thus reducing the distance between the supporting element 26 and the stud 22 and likewise tightening the stretching spring 27.

Once the locking elements of the stud 22 have locked into a new chain link, the compressed spring exerts a downward force on the stud forcing the stud to the position it occupied before the stretching force was exerted on it. The design of the locking means 23 assures that the new chain link engaged by the locking elements is also forced downward with the stud because of the force of the compressed spring. Locking elements 25 are also designed so that the chain links can only pass therethrough in a downward direction.

Of course, an increase of the tension on the stretching chain again increases the tension on the connected tire chain. The slack in the tire chain due to wear is compensated and the chain again is held snugly against the tire.

The stretching device according to the invention does not only compensate a starting loosening of the stretching chain in tire chains because of the settling of the separate chain links, but it also compensates for potential loosenings of the tire chain because of wear on single chain links. When the wear is great, it is possible that a tire chain provided with a stretching device according to the invention should be tightened again. In any case, when using the stretching device according to the invention, stretching of the tire chain will be required at considerably lesser frequency than was necessary prior to the invention. Additionally, tire chains that are already in use can still be equipped with the described stretching device because the construction of the device makes it readily adaptable to such situations.

I claim:

1. A stretching device for the stretching of a tire chain, used in conjunction with a stretching chain connected to said stretching device, said stretching device comprising a stretching spring, a stretching aggregate for stretching said spring, at least one stretching element, one end of said aggregate acting on said stretching element for holding said stretching chain stretched when said stretching spring is stretched.

2. A stretching device according to claim 1, wherein the stretching element is a safety bolt capable of movement in only one direction relative to the stretching chain.

3. A stretching device according to claim 2, wherein the safety bolt comprises a pin and a return spring, said pin being slidable against the action of said return spring.

4. A stretching device according to claim 2, wherein the safety bolt comprises a rocking lever.

5. A stretching device according to claim 1, wherein the stretching spring surrounds a section of the stretching chain.

6. A stretching device according to claim 1, wherein the stretching aggregate includes a threaded spindle and an outer sleeve screwably connected thereon.

7. A stretching device according to claim 6, wherein said threaded spindle comprises an inner sleeve and said inner and said outer sleeves surround a section of said stretching chain.

8. A stretching device according to claim 6, wherein said outer sleeve of said stretching aggregate is a tightening nut.

9. A stretching device according to claim 1, wherein the stretching aggregate includes two studs, the first of said studs for stretching the stretching spring and the second of said studs for braking said stretching device on said stretching chain.

10. A stretching device according to claim 9, including at least one stretching element attached to said first stud for stretching said stretching spring.

11. A stretching device according to claim 9, wherein said second stud has at least one locking element that grips between two adjacent chain links of the same orientation as said stretching chain.

12. A stretching device according to claim 9, wherein said studs comprise rings or sleeves that surround a section of said stretching chain.

13. A stretching device according to claim 1, wherein the stretching spring is a compression spring.

14. A stretching device according to claim 1, wherein the stretching spring has a curve with a part along which the stretching tensional force is independent from the stretching path.

15. A stretching device according to claim 1, including a support element wherein the end of the stretching spring that is turned away from the end of the stretching chain rests against a support element that surrounds the stretching chain and is movable relative thereto.

16. A stretching device according to claim 15, including a protective sleeve for said stretching spring wherein said supporting element is formed by the bottom of said protective sleeve.

17. A stretching device according to claim 1, including a pair of stretching elements.

18. A stretching device according to claim 9 including a pair of locking elements for holding said stretching chain between said first and second studs.

* * * * *

UNITED STATES PATENT OFFICE
CERTIFICATE OF CORRECTION

Patent No. 4,118,834          Dated October 10, 1978

Inventor(s) Erhard Alfred Weidler

It is certified that error appears in the above-identified patent and that said Letters Patent are hereby corrected as shown below:

Column 2, Line 33 - "passed" should be -- pressed --.

Signed and Sealed this

Sixteenth Day of January 1979

[SEAL]

Attest:

RUTH C. MASON
*Attesting Officer*

DONALD W. BANNER
*Commissioner of Patents and Trademarks*